United States Patent [19]

Astier et al.

[11] 4,404,449

[45] Sep. 13, 1983

[54] TRANSMISSION DEVICE AND MACHINE TOOL COMPRISING SAME

[75] Inventors: Jean-Francois Astier, Boisseuil-Feytiat; Louis Bessaguet, Limoges, both of France

[73] Assignee: Legrand, Limoges, France

[21] Appl. No.: 350,238

[22] Filed: Mar. 19, 1982

[30] Foreign Application Priority Data

Feb. 23, 1981 [FR] France ................................ 81 03511

[51] Int. Cl.$^3$ ........................... B23P 1/08; B06B 3/00

[52] U.S. Cl. .............................. 219/69 V; 173/162 R

[58] Field of Search ................ 219/69 V, 69 M, 69 R; 173/162 R; 308/3 A, 5 R; 248/550

[56] References Cited

U.S. PATENT DOCUMENTS

| | | | |
|---|---|---|---|
| 3,072,777 | 1/1963 | McKechnie | 219/69 V |
| 3,390,244 | 6/1968 | Webb | 219/69 D |
| 4,336,917 | 6/1982 | Phillips | 248/550 |

FOREIGN PATENT DOCUMENTS

| | | |
|---|---|---|
| 820506 | 1/1975 | Belgium . |
| 1599285 | 8/1970 | France . |

*Primary Examiner*—B. A. Reynolds
*Assistant Examiner*—Alfred S. Keve
*Attorney, Agent, or Firm*—Charles E. Brown

[57] ABSTRACT

A transmission device comprises a hollow casing and a core member disposed in the casing. The core member is free to move in the casing in all directions. It has at least two arms to each of which a driving member or a driven member may be connected. The arms of the core member have a non-aligned angular relationship to one another. The casing incorporates an internal housing whose configuration is a homothetic replica of that of the core member. There is clearance between the core member and the housing in all directions. At least part of each wall of the housing facing one of the arms of the core member is formed with at least one hole or recess which, by means of a network of internal conduits in the casing, can communicate with a source of pressurized supporting fluid. The transmission device is applicable to machine tools using ultrasonic, spark erosion and electrochemical machining processes.

17 Claims, 10 Drawing Figures

TRANSMISSION DEVICE AND MACHINE TOOL COMPRISING SAME

BACKGROUND OF THE INVENTION

1. Field of the Invention

The present invention concerns transmission devices designed to be placed between a first member, hereinafter referred to as the driving member, and a second member, hereinafter referred to as the driven member, and is more particularly, but not exclusively, concerned with the situation in which the driven member constitutes or is associated with a vibrating machining tool.

2. Description of the Prior Art

As is well known, it is common practice to subject tools to subsonic or ultrasonic mechanical vibration in order to increase productivity.

For the tool, constituting the driven member, to be subjected to vibration by a vibration generator, constituting the driving member, in practice a transducer itself connected to a pulse generator, a transmission device must be disposed between the tool and the bed of the machine to which it is fitted. This is to attach the tool to and to correctly position it relative to the bed, which constitutes a reference support, and also to enable the tool to be acted upon by the vibration generator.

The general problem to be overcome in the design of such transmission devices is that they must transmit vibration without attenuating it from the vibration generator constituting the driving member to the tool constituting the driven member, without transmitting the vibration to the bed of the machine forming the reference support (in order to protect other units mounted on same) and in such a way, in at least certain applications (spark erosion machines, for example), as to provide electrical insulation between the tool (in this instance a working electrode) and the bed.

Transmission devices so far proposed for this purpose comprise, for example, dampers of an elastic material, elastic diaphragms and hydrodynamic and aerodynamic suspension techniques.

At least some of these devices comprise a hollow casing to be attached to the bed forming the reference support and a core member disposed in the casing and free to move therein in all directions, the core member having at least two arms extending to the outside of the casing and to each of which either the driving member or the driven member may be connected.

However, in embodiments of this type disclosed to date the two arms of the "floating" core member are always in practice aligned with one another.

This has a number of disadvantages.

Firstly, it provides only for linear transmission of vibration from the driving member to the driven member, so that the overall assembly is relatively bulky.

The driving member and the driven member are necessarily disposed between the head of the machine supporting the assembly and the working table of the bed on which the workpiece is placed.

To secure good vibration propagation conditions the driving member and the driven member are necessarily of a length at least equal to the half-wavelength of the vibration, generally a significant length.

Also, the power input is limited to the power output of the single driving member which may be used.

Also, in certain cases at least, the positioning of the tool forming the driven member is insufficiently accurate.

Finally, it is difficult to attach the assembly to the head of the machine in such a way as to conform to the required conditions of electrical insulation, in particular through the location of the vibration generator constituting the driving member between the casing and the head.

This is the primary reason for which, in spark erosion machine tools known as of this date and using a vibrating tool, it is necessary in practice to alternate the application of voltage to the tool with the application of vibration to it. This prevents the full benefit of applying vibration to the tool being obtained.

One object of the present invention is to provide a transmission device using a fluid suspension which overcomes these disadvantages and offers additional advantages. Another object of the invention is to provide a machine tool incorporating the aforementioned transmission device.

SUMMARY OF THE INVENTION

The present invention consists in a transmission device designed to be placed between a first member, hereinafter referred to as the driving member, and a second member, hereinafter referred to as the driven member, said device comprising a hollow casing and a core member disposed in said casing and free to move therein in all directions, said core member having at least two arms with a non-aligned angular relationship to one another and extending to the outside of said casing and to each of which either said driving member or said driven member may be connected, said casing incorporating an internal housing with a configuration which is a homothetic replica of the configuration of said core member, with clearance between said core member and said housing in all directions, walls with at least part or each wall facing a respective one of said arms of said core member being formed with a recess or hole, and a network of internal conduits whereby each of said recesses or holes can communicate with a source of pressurized supporting fluid.

In a preferred embodiment of the invention, the arms of the core member are at an angle of 90° to one another.

Thus, using the arrangement in accordance with the invention, the arm to which the driving member is connected and that to which the driven member is connected are not necessarily aligned with one another. This arrangement also benefits from the experimentally proven fact that a component with one arm subjected to vibration transmits the vibration in a like manner to its other arms, irrespective of their orientation relative to the arm subject to the vibration. This arrangement offers the advantage of a significant reduction in the overall dimensions of the assembly.

As a result of the use of this arrangement, the vibration generator constituting the driving member is not necessarily disposed axially between the head of the machine tool and the worktable.

On the contrary, it may be disposed to one side and so have no effect on the axial dimension of the assembly.

In a specific embodiment of the invention, the core member comprises four arms, disposed in practice in a cruciform arrangement.

This offers the advantage of making it possible to associate one or more driving members with the same driven member, so as to obtain the best optimum power input.

FURTHER DISCUSSION OF THE PRIOR ART

French Pat. No 1 599 285 discloses the use of a vibratory unit which, like the core member of the transmission device in accordance with the present invention, comprises arms with a non-aligned angular relationship to one another.

However, the disclosure of French Pat. No 1 500 285 is directed towards a concentration at the vibratory unit of the power output by vibration generators associated therewith, the field of application apparently being limited to the processing of a fluid to which said vibratory unit is applied directly. There is no specific disclosure or suggestion of the use of any such vibratory unit within a casing from which it is insulated by means of a supporting fluid.

In accordance with one aspect of the invention, this installation makes it possible to avoid any transmission of vibration from the core member to the casing, while in no way restricting vibration of the core member.

The supporting fluid used is preferably elastically compressible, so that vibration is not transmitted between the core member and the casing.

This fluid may with advantage be compressed air.

In a machine tool using the transmission device in accordance with the invention, placed between a head of the machine and a driven member which may be a machining tool or member, in which case the workpiece is suitably attached to a support (a worktable, for example) opposite the head of the machine (or which, in an alternative arrangement, may constitute the workpiece, the machining tool or member then being attached to said support), the use of the transmission device in accordance with the invention offers the advantage of reducing the distance between the head and the support, as the vibration generator may then be disposed laterally, facilitating its use.

The invention also enables the use of more than one vibration generator, where increased vibration power input is required, each vibration generator being disposed laterally.

The invention also provides for improved positioning of the driven member (machining tool or workpiece) by means of the casing, which itself preferably provides for the use of a standard design of coupling device for its attachment to the head of the machine. As a corollary of this, its movement (and thus movement of the driven member) from one machine tool to another is facilitated.

Finally, the lateral disposition of the vibration generator or generators provides protection thereof against vibration in the case of an accident.

Experience confirms the surprising fact that the shock wave produced by a mechanical impact does not propagate laterally, and thus does not affect the vibration generator or generators used, although the useful vibration propagates in all directions.

The machine tool to which the transmission device in accordance with the invention is applied may be a basic type of machine tool using an ultrasonic machining process.

However, further benefit may with advantage be drawn from the supporting fluid used in the transmission device in accordance with the invention by extending applications of the latter to machine tools using spark erosion and electrochemical machining processes.

The supporting fluid can offer the advantage of providing not only mechanical isolation of the core member from the casing, surrounding as it does the core member on all sides, but also electrical insulation of the core member from the casing.

Thus there is no problem in connecting the core member to a driven member to which voltage is applied, such as the electrode of a machine tool using a spark erosion or electrochemical process, for example.

As a result, when applied to such machines, the transmission device in accordance with the invention offers the advantage of permitting continuous application of vibration to the driven member, even when it is actively working and thus live.

Thus one feature of a machine tool in accordance with the invention using a spark erosion or electrochemical machining process is that the driven member (machining tool or workpiece) may be connected both to a vibration generator and to an electrical generator, for simulataneous application to the driven member of mechanical vibration and an electrical voltage, pulsed or otherwise.

In other words, the transmission device in accordance with the invention provides the advantage of permitting real ultrasonic enhancement of machining by a spark erosion or electrochemical process.

Such ultrasonic enhancement offers the advantage of increased stability of machining and reduced striking of arcs between the tool and workpiece, the components dissociated from earth being mechanically prevented from coming into contact with at least the part constituting the driven member, due either to an increase in the current or to a reduction in the electrode deformation normally encountered.

As a safety measure, the casing of the transmission device in accordance with the invention, which comprises, on each side of the core member and in the central area of the housing therefor, at least one discharge passage providing communication between the housing and a discharge vent (venting to the atmosphere, for example), to permit local escape of the supporting fluid injected under pressure into the gap between the core member and the casing, is provided, in accordance with one aspect of the invention, with a pressure sensor on at least one of said discharge passages, controlling the driving member.

The pressure sensor comes into action as soon as the pressure of the supporting fluid drops below a predetermined threshold to shut down the vibration generator or generators constituting the driving member, offering the advantage of preventing the core member touching the casing when live.

If necessary and where appropriate, this safety measure may also be applied to the electrical feed (if any) to the driven member, cutting off same.

Finally, the casing of the transmission device in accordance with the invention preferably has an external shape in the general form of a parallelpipedal block.

This configuration offers the advantage of facilitating the attachment of the casing by any of its surfaces to the head of a machine, by means (for example and as indicated above) of a standard type of adaptor or coupling device which, suitably attached to one surface of the casing, is designed to cooperate with the attachment device normally provided on the head, for mounting a tool.

This parallelepipedal shape of the casing offers the advantage that the transmission device in accordance with the invention may be stacked with other transmission devices of similar design, for the simultaneous machining in parallel of a plurality of separate workpieces on the same machine.

To summarize, the transmission device in accordance with the invention offers the advantage of contributing to the achievement of good productivity from the machine tool to which it is fitted.

Other objects and advantages will appear from the following description of examples of the invention, when considered in connection with the accompanying drawings, and the novel features will be particularly pointed in the appended claims.

DESCRIPTION OF THE PREFERRED EMBODIMENTS

Figure 1:
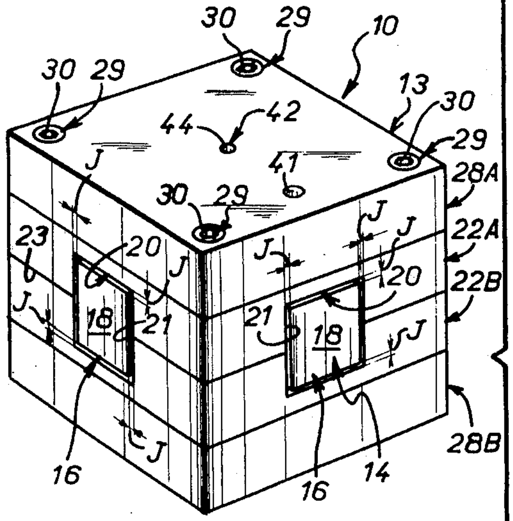
FIG. 1 is a perspective view of a transmission device in accordance with the invention in the assembled state.
Figure 2:
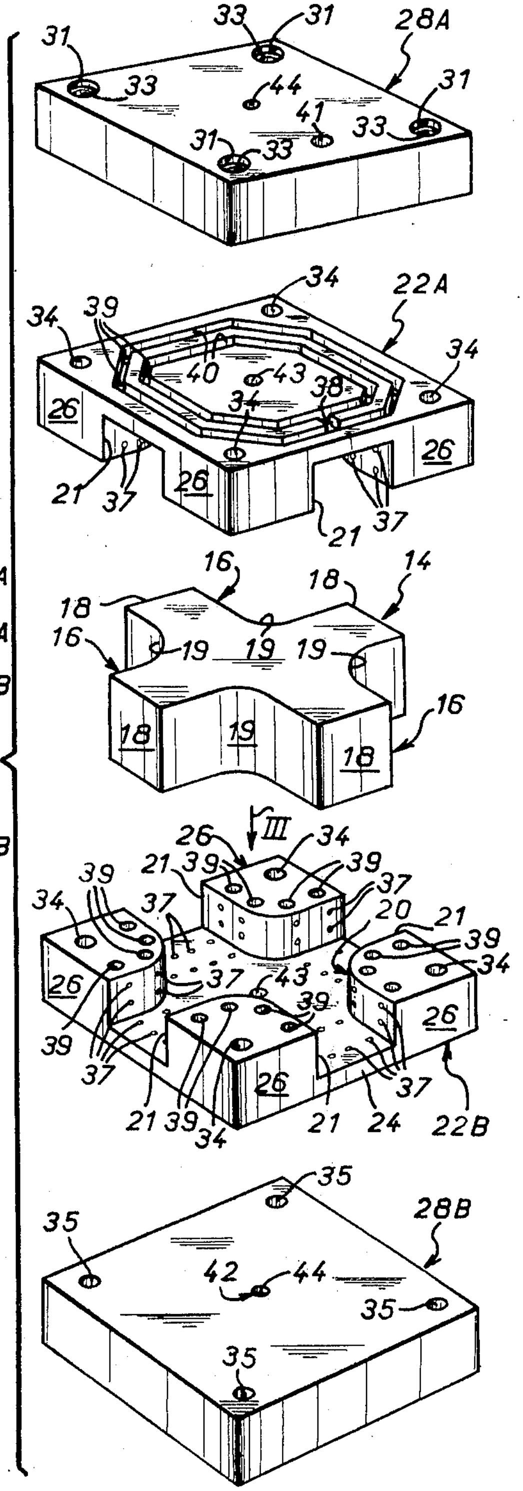
FIG. 2 is an exploded perspective view of the device.

Referring to the drawings, the transmission device 10 in accordance with the invention, designed to be placed between a first member 11 (hereinafter referred to as the driving member) and a second member 12 (hereinafter referred to as the driven member and shown in FIG. 5), comprises a hollow casing 13 and a core member 14 disposed in said casing and free to move therein in all directions (FIGS. 1 and 2). Said core member has at least two arms 16 extending to the outside of said casing and to each of which either said driving member or said driven member may be connected.

In accordance with one aspect of the invention, said arms 16 have a non-aligned angular relationship to one another.

In the embodiment shown, there are four arms 16 in a generally cruciform arrangement, forming pairs of arms at 90° to each other.

In this embodiment, the end of each arm 16 is rectangular in transverse cross-section, with a rectangular end face 18.

The rectangular end face 18 may be square, for example.

In practice, in the embodiment shown, arms 16 of core member 14 are identical, and in particular their end surfaces 18 have the same surface area.

In their respective root areas arms 16 are joined together by cylindrical intermediate surfaces 19 having a large radius of curvature.

In practice, in the embodiment shown, core member 14 constitutes a solid plate with parallel surfaces and formed so that arms 16 are an integral part of it.

Core member 14 may be fabricated from metal, and in particular aluminium, or from a ceramic material, for example.

If of aluminum, it is preferably anodized to insulate it or to contribute to its insulation.

In the embodiment shown, casing 13 has the general external shape of a parallelpipedal block.

Internally it is formed with a housing 20 for core member 14, the configuration of this housing constituting a homothetic replica of that of core member 14, there being clearance J between core member 14 and housing 20 in all directions.

Housing 20 opens to the outside on each of four faces of casing 16 constituting opposed pairs, by means of rectangular openings 21 which homothetic to the end faces 18 of arms 16 of core member 14.

Figure 3:
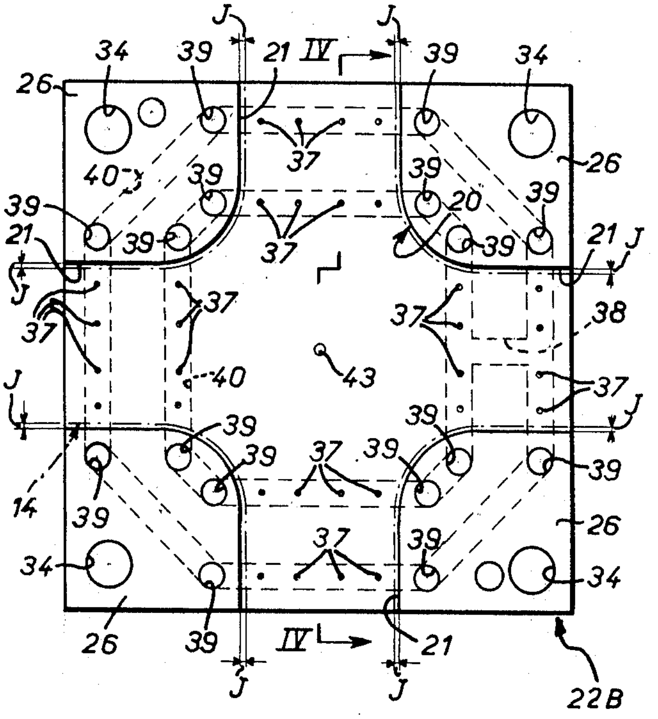
FIG. 3 is a plan view to a different scale of a flange forming part of a casing forming part of the transmission device, as seen in the direction of arrow III in FIG. 2.

As indicated in FIG. 1 and as shown schematically in FIG. 3, the aforementioned clearance J is found between each edge of each end face 18 and the corresponding edge of the corresponding opening 21 in casing 13.

Figure 4:
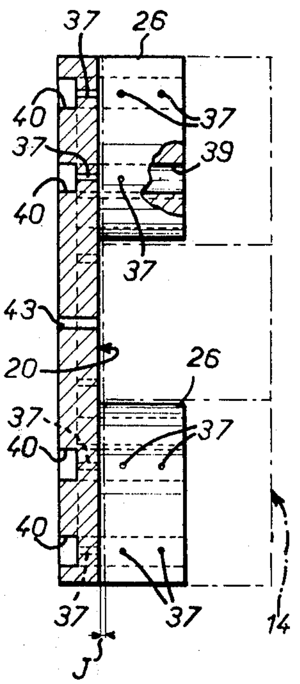
FIG. 4 is a partially cut away transverse cross-section through the aforementioned flange, on the line IV—IV in FIG. 3.

As shown schematically in FIG. 4, this clearance is also found between the main surfaces of core member 14 and the corresponding surfaces of housing 20 in casing 13.

This clearance J may be, for example, less than 0.05 mm, and is preferably less than 0.02 mm.

In other words, as this clearance exists on each side of core member 14, for both senses of movement in any direction, there is a total clearance for both senses of movement in any direction of less than 0.1 mm, and preferably less than 0.04 mm.

It will be realised that these numerical values are given here by way of example only.

In the embodiment shown, the end faces 18 of arms 16 of core member 14 are coplanar with the corresponding surfaces of casing 13.

Also, in this embodiment, casing 13 comprises two flanges 22A, 22B which mate with one another to define housing 20 for core member 14.

In practice, flanges 22A and 22B are identical, mating together at a plane median surface 23, each defining one half the thickness of housing 20 for core member 14.

Thus each flange 22A, 22B comprises a sole plate 24 with on each corner thereof a respective boss 26.

In the embodiment shown in FIGS. 1 to 6, casing 13 further comprises two covers 28A, 28B located over flanges 22A, 22B, respectively.

Flanges 22A, 22B and covers 28A, 28B, which are all of the same rectangular shape, are assembled together by means of bolts 29 at their corners and extending parallel to corresponding edges of the block which they constitute when so assembled.

The heads 30 of these bolts 29 bear against the bottom surface of depressions 31 formed for this purpose in the surface of cover 28A. Their shanks 32, only the ends of which are visible in FIG. 5, pass in succession (and in this order) through cover 28A (passages 33), flanges 22A, 22B (passages 34) and cover 28B (threaded holes 35).

Internally of casing 13, at least part of each wall of housing 20 facing a respective one of said arms 16 of core member 14 is formed with at least one recess, casing 13 including a network of internal conduits, to be described in detail later, whereby each of said recesses can communicate with a source of pressurized supporting fluid.

In the embodiment shown in FIGS. 1 to 6, there are several such recesses, each forming a nozzle 37.

In practice, in this embodiment, the parts of the walls of housing 20 comprising these nozzles 37 extend away from the outlets 21 from housing 20.

Nozzles 37 are formed in both the sole plate 24 and the bosses 26 of flanges 22A, 22B.

In the embodiment shown, they extend in two rows at different distances from the center of housing 20, being regularly spaced in each row.

Conduits formed in casing 13 to communicate with nozzles 37 in bosses 26 of flanges 22A, 22B comprise bores 39 in these bosses 26 parallel to one another and perpendicular to the corresponding sole plate 24, nozzles 37 opening directly into bores 39.

The aforementioned conduits further comprise grooves 40 formed on the surfaces of flanges 22A, 22B opposite housing 20 into which open the aforementioned bores 39 and also nozzles 37 in sole plate 24 of flanges 22A, 22B. In practice, in the embodiment shown, there are two concentric annular grooves 40 which communicate in the transverse direction with one another by means of a passage 38.

Finally, the conduits connecting to nozzles 37 comprise a bore 41 in cover 28A, in line with one of grooves 40 in the underlying flange 22A.

Bore 41 in cover 28A may be connected to a source of pressurized supporting fluid via a connector and hose (not shown).

In practice, this source is a source of compressed air.

Finally, on each side of core member 14 casing 13 comprises, in the central area of housing 20 for core member 14, at least one discharge passage 42 for connecting said housing to a discharge vent, a vent to the atmosphere, for example.

In the embodiment shown, a single discharge passage 42 is provided on each side of core member 14, comprising consecutively a bore 43 in the center of each flange 22A, 22B and a bore 44, aligned with bore 43, in the center of each cover 28A, 28B.

Casing 13 may be fabricated as previously described from a metal (aluminium, for example) or a synthetic material. Nozzles 37 may be cylindrical in shape, with a diameter of approximately 1 mm and preferably of approximately 0.8 mm.

As previously, these numerical values are given by way of example only, having no limiting effect with regard to the scope of the invention.

In service, the supporting fluid used is injected into the gap between core member 14 and housing 20 of casing 30, through the multiplicity of nozzles 37 formed for this purpose in the casing adjacent the points at which arms 16 of core member reach the outside of the casing. It escapes through the gap formed by virtue of the clearance J around arms 16 (to outlets 21 from housing 20) and discharge passages 42.

In practice, the pressure at which the supporting fluid is injected is selected according to the number and diameter of nozzles 37, the cross-section of the discharge path for the fluid (see above), the power to be transmitted from the driving member to the driven member, and the amplitude of the vibration to be applied to core member 14 by the aforementioned driving member.

Allowing for all these parameters, the injection pressure is selected so that under all operating conditions core member 14 "floats" inside casing 13, without contacting it at any point.

Thus when in service and operating normally, core member 14 is mechanically and electrically isolated from casing 13 by the layer of supporting fluid which exists between it and casing 13 at all points. This fluid is elastically compressible so as not to transmit vibration) and electrically insulating.

Figure 5:
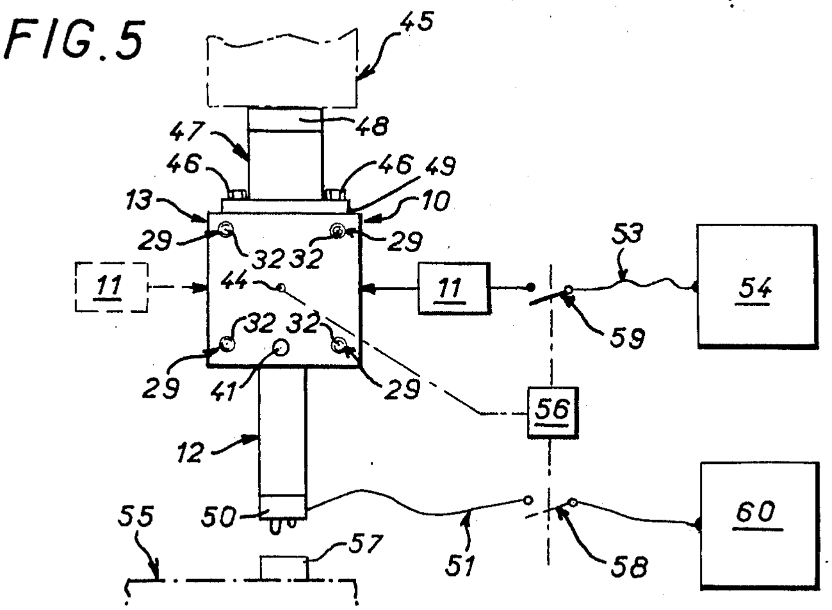
FIG. 5 is a view in elevation showing the use of a transmission device in accordance with the invention on a machine tool using a spark erosion machining process.

As represented schematically in chain-dotted outline in FIG. 5, transmission device 10 in accordance with the invention may, for example, be attached to the head 45 of any kind of machine tool, in particular a machine tool using a spark erosion or electrochemical machining process, opposite a support such as a workpiece table 55, for example, suitable for supporting, for example, workpiece 57.

The principle of such machines is well known, and so will not be described in detail in the present document.

Only those parts of the machine tool necessary to an understanding of the invention will be described.

To permit attachment of transmission device 10 in accordance with the invention to head 45, an intermediate plate 49 is attached to one surface of casing 13 comprising an outlet 21 from housing 20, threaded holes 75 being provided for this purpose at the corners of casing 13. By means of screws 61 inserted in appropriately formed cut-outs 62 in its lower surface (in the embodiment shown in full outline in FIG. 6), intermediate plate 49 is itself attached to an adaptor or coupling device 47 providing the connection to the retaining device 48 normally fitted to head 45.

Two screws 61 are sufficient for this purpose.

Figure 6:
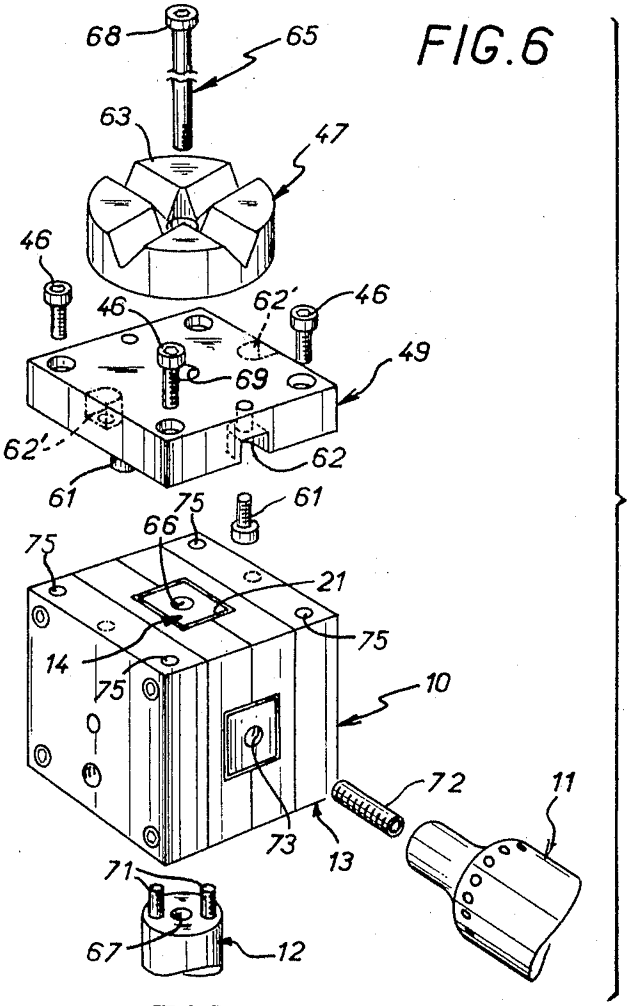
FIG. 6 is a perspective view showing this implementation in more detail.

In the embodiment shown in dashed outline in FIG. 6, two screws 46 are sufficient to attach intermediate plate 49 to casing 13. As shown in the drawing, cut-outs 62' may be formed in the top of the plate for this purpose.

Whichever method is used, the arrangement is such that intermediate plate 49 does not come into contact at any point with core member 14.

The adaptor or coupling device 47 may be, for example, of the type described in U.S. Pat. No. 3,271,848, as available commercially under the brand name "IMEA."

Only the female part 63 of adaptor 47 is shown in FIG. 6. It is assembled to an associated male part (not shown) fixed to head 45 by attachment device 48, in the usual manner using an eccentric pin.

On the opposite side of casing 13 the electrode 12 is mounted on the end face 18 of the corresponding arm 16 of core member 14. In this instance, electrode 12 is a hybrid electrode, only its tip 50 being of graphite and constituting a machining tool. This tip 50 of electrode 12 is connected by a wire 51 to an electrical generator 60 by which it is rendered live.

In the embodiment shown in FIG. 6, electrode 12 is attached to core member 14 by means of a bolt 65 which passes through female part 63 of coupling device 47 and through core member 14, through a bore 66 in the latter, to engage in a threaded hole 67 in electrode 12. Its head 68 bears against the opposite surface of core member 14.

The central area of intermediate plate 49 is formed with an opening 69 which accommodates head 68 of bolt 65, without coming into contact with it.

Thus intermediate plate 49 prevents vibration being transmitted to coupling device 47.

For rotational indexing on core member 14, electrode 12 may, for example and as shown in FIG. 6, comprise two pins 71 projecting on respective sides of threaded hole 67, engaging with complementary holes formed for this purpose in core member 14 but not visible in the drawings.

To the side, vibration generator (transducer) 11 is attached to the end face 18 of the corresponding arm 16 of core member 14 by any appropriate means. It is connected by a wire 53 to an appropriate form of pulse generator 54.

For example, and as shown in FIG. 6, vibration generator 11 (which may be, for example, of the type marketed by BRANSON) is connected to core member 14 by means of a threaded stud 72 which engages in a threaded hole 73 in core member 14 and in a threaded hole (not visible in the drawings) in vibration generator 11.

As represented schematically in chain-dotted outline in FIG. 5, a second vibration generator 11 may, in accordance with the invention, be connected to the opposite arm 16 of core member 14, by means analogous to those already described, where this is required to secure the necessary power input.

It will be seen that, due to the arrangement in accordance with the invention, adaptor device 47 may be of any size, and not necessarily tuned to the vibration half-wavelength.

Only electrode 12 must be tuned to this half-wavelength.

As a result, in the direction perpendicular to workpiece table 55 on which workpiece 57 is placed, the size of transmission device 10 in accordance with the invention may, with advantage, be reduced as compared with the arrangement in which vibration generator 11 is aligned with electrode 12, so facilitating installation.

As shown in FIG. 5, as a safety measure a pressure sensor 56 is preferably connected to one of discharge passages 42 in casing 13, being connected to the driving member constituted in this case by vibration generator 11. For example, pressure sensor 56 may operate a switch 59 in wire 53 by means of which vibration generator 11 is connected.

Likewise, a switch 58 operated by pressure sensor 56 may be connected into wire 51 connected to the tip 50 of electrode 12.

Thus as soon as the supporting fluid discharge pressure drops below a predetermined threshold, the supply to vibration generator 11 (and where applicable that to electrode 12) is automatically cut off, to prevent core member 14 coming into contact with casing 13 when live.

The pressure sensor used may be a simple depressurization valve.

As in this instance the description concerns a spark erosion machine the usual arrangements are naturally implemented to inject a liquid dielectric betwen machining tool 50 and workpiece 57.

In the case of a machine tool implementing an electrochemical process, the usual arrangements would be taken to surround machining tool 50 and workpiece 57 with a bath of electrolyte.

Such arrangements will be well known to those skilled in the art and as they form no part of the present invention they will not be described in detail here.

In the foregoing description it has been assumed that machining tool 50 was carried by electrode 12 and thus constituted the driven member with regard to transmission device 10 in accordance with the invention. Workpiece 57 has so far been described as attached to workta-ble 65 of the machine tool or to any other support rigidly coupled to the bed of the machine tool.

This is the most usual form of arrangement, and is suitable in particular for cases in which workpiece 57 cannot be tuned accoustically.

Figure 7:
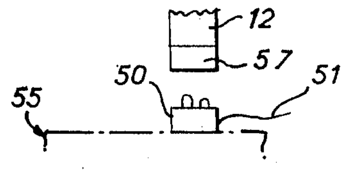
FIG. 7 shows a modification to part of FIG. 5, for an alternative embodiment.

However, as shown schematically in FIG. 7, the opposite arrangement may be adopted when workpiece 57 can be tuned accoustically. In this case workpiece 57 is attached to electrode 12 and is directly influenced by the ultrasonic vibration. It may be considered as forming part of electrode 12. In this case, a more accurate designation for this component would be "sonotrode."

With this arrangement, as shown in FIG. 7, machining tool 50 is, as previously, connected by wire 1 to electrical generator 60.

As an alternative, with reversed polarity, workpiece 57 would be connected to electrical generator 60 in both cases.

Whether the machine tool uses a spark erosion or electrochemical machining process, the essential requirement is that a potential difference is established between machining tool 50 and workpiece 57.

Thus, in accordance with the invention, whether the driven member connected to core member 14 is machining tool 50 or workpiece 57, mechanical vibration and electrical voltage are applied simultaneously to it.

In the case of a spark erosion machine, this voltage is pulsed. The voltage may be pulsed or continuous in a machine using an electrochemical machining process.

It will be appreciated that in the case of a basic machine implementing an ultrasonic process no electrical generator is used.

Figure 10:
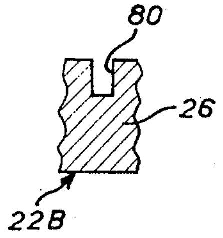
FIG. 10 is a partial transverse cross-section through this embodiment, on the line X—X in FIG. 9.
Figure 8:
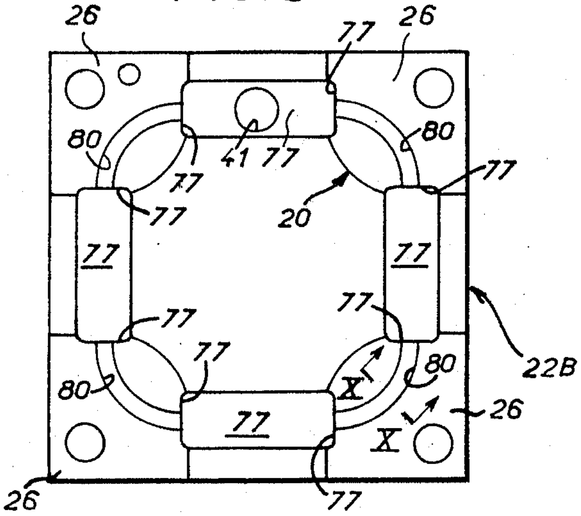
FIGS. 8 and 9 are views analagous to those of FIGS. 3 and 4, to a different scale and relating to a different embodiment.
Figure 9:
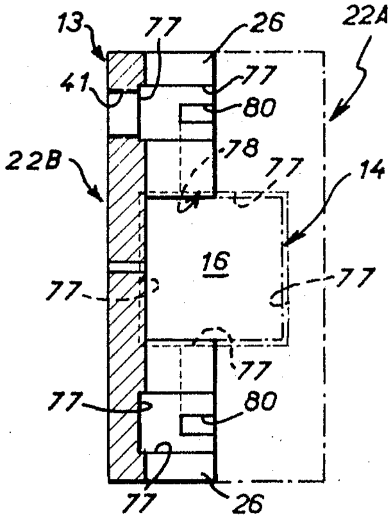

FIGS. 8 to 10 show an alternative embodiment, those parts of these drawings in full outline showing only one flange 22B of casing 13, it being understood that flange 22A (shown in chain-dotted outline in FIG. 9) is identically constituted. In each wall of housing 20 for core member 14 a recess 77 for injecting a supporting fluid extends across the full width of the wall.

In practice, each recess 77 in each wall extends from one of bosses 26 delimiting the wall to the other. As each boss is formed with a similar recess 77, it forms part of an annular chamber 78 extending continuously around the corresponding arm 16 of core member 14, in the vicinity of the end thereof.

The conduits in casing 13 connecting to the chamber 78 thus formed in housing 20 in the latter comprise, from one such chamber 78 to the next, at least one groove 80 formed in the surface of at least one of flanges 22A, 22B facing towards housing 20. In practice, a groove 80 is formed in the surface in question of each of flanges 22A and 22B.

This groove 80 extends across each of bosses 26, in a curved shape as shown in the drawing (by way of example), from one recess 77 to another.

The feed hole 41 is formed in line with one of recesses 77, and no cover (such as covers 28A, 28B in the first embodiment described) is required.

Otherwise this embodiment is analogous to that previously described, being used in the same way.

Thus it will be seen that in all cases the block constituting the transmission device in accordance with the invention has the advantage of providing at least three mutually perpendicular surfaces, facilitating its use: one surface for mounting it on the bed of the machine, one surface for coupling to a driving member, and one surface for coupling to a driven member.

It offers the additional advantage that tools may be quickly and easily interchanged, by virtue of its rigidity and compact dimensions.

Further, it may be easily stacked with other transmission devices of similar design. In this case one or both covers forming part of the casing (or one or both flanges in the embodiment with no such covers) may be replaced with an intermediate plate which, by means of a lateral hole opening onto its edge surface intersecting the transverse bore normally used for this purpose, provides a simultaneous feed of supporting fluid to two intermediate casings.

It will be understood that various changes in the details, materials and arrangements of parts, which have been herein described and illustrated in order to explain the nature of the invention, may be made by those skilled in the art within the principle and scope of the invention as expressed in the appended claims.

Specifically, it is not indispensible that the core member comprise four arms.

On the contrary, the number of arms may be reduced to three or even two.

Also, the number of arms may exceed four, with arms extending transversely to each side of a common longitudinal member, parallel to one another.

Also, it is not imperative that the transverse cross-section at the ends of the arms be the same from one arm to the next.

On the contrary, when a different transmission ratio is required, the transverse cross-section at the ends of different arms of the core member may be different.

Furthermore, where the core member comprises four arms in a cruciform arrangement, it is not necessary for the arms to all be of the same length.

On the contrary, for one branch of the cross the arms of the cross member may, for example, be tuned to the vibration half-wavelength, whereas for the other branch of the cross they may be tund to a multiple of this half-wavelength.

Finally, while there has been no mention of any sealing gasket between the various component parts of the casing in the foregoing description, such gaskets may be used where necessary.

Applications of the invention are not limited to machine tools using ultrasonic, spark erosion and electrochemical machining processes. They extend more generally to cover all situations in which a driven member is to be subjected to vibration by a driving member, and even to other forms of action by the driving member, as also to the situation in which any driven member is subject to unwanted vibration which must not be transmitted to the supporting bed, where the driven member is a tool for machining a rotating workpiece, for example.

It is claimed:

1. A transmission device designed to be placed between a first member, hereinafter referred to as the driving member, and a second member, hereinafter referred to as the driven member, said device comprising a hollow casing and a core member disposed in said casing and free to move therein in all directions, said core member having at least two arms with a non-aligned angular relationship to one another and extending to the outside of said casing and to each of which either said driving member or said driven member may be connected, said casing incorporating an internal housing with a configuration which is a homothetic replica of the configuration of said core member, with clearance between said core member and said housing in all directions, walls with at least part of each wall facing a respective one of said arms of said core member being formed with a recess or hole, and a network of internal conduits whereby each of said recesses or holes can communicate with a source of pressurized supporting fluid.

2. A transmission device according to claim 1, in which said parts of said walls of said housing for said core member extend away from the outlets to the outside therefrom.

3. A transmission device according to claim 1, in which each wall of said housing of said core member is formed transversely with at least one row of holes each of which constitutes a nozzle.

4. A transmission device according to claim 1, in which in each of said walls of said housing for said core member said recess extends across the full width of the wall and constitutes part of an annular chamber continuously surrounding the corresponding arm of said core member.

5. A transmission device according to claim 1, wherein said casing comprises two flanges disposed on respective sides of said core member and mating together to define said housing for said core member.

6. A transmission device according to claim 5, wherein said flanges are identical and mate together at a plane median surface, each defining one half of the thickness of said housing for said core member.

7. A transmission device according to claim 3, wherein said casing comprises two flanges disposed on respective sides of said core member and mating together to define said housing for said core member, and wherein conduits formed in said casing to connect to said nozzles open into said housing for said core member and comprise grooves formed on the surfaces of said flanges of said casing opposite said housing, with bores opening into said grooves, into which open said nozzles, said casing further comprising covers superposed on respective flanges and one of which is formed with at least one bore for connecting said grooves to the source of pressurized supporting fluid.

8. A transmission device according to claim 4, wherein said casing comprises two flanges disposed on respective sides of said core member and mating together to define said housing for said core member, and wherein conduits formed in said casing to connect to said recesses of said housing for said core member comprise a groove formed on the surface of at least one of said flanges facing said housing, whereby said recesses communicate with one another in pairs.

9. A transmission device according to claim 1, wherein the total clearance between said core member and said housing in any direction is less than one tenth of a millimeter and preferably less than four hundredths of a millimeter.

10. A transmission device according to claim 1, wherein said casing comprises, on each side of said core member, in the central area of said housing for said core member, at least one discharge passage for connecting said housing to a discharge vent, such as a discharge vent to the atmosphere, for example.

11. A transmission device according to claim 1, wherein said arms of said core member are at an angle of 90° to one another, with surfaces having a large radius of curvature joining their respective root portions.

12. A transmission device according to claim 11, wherein said core member comprises four arms in a cruciform configuration, the transverse cross-section of which at the free end is rectangular, said core member thus being in the general form of a massive plate with parallel surfaces, formed with said arms as an integral part thereof.

13. A transmission device according to claim 12, wherein all of said arms of said core member are identical.

14. A transmission device according to claim 1, wherein said casing has an external shape in the general form of a parallelepipedal block.

15. A machine tool comprising a bed or equivalent means and a head a workpiece and a machining tool, said bed supporting one of said workpiece and machining tool and said head supporting the other of said workpiece and machining tool, that one of said workpiece and machining tool supported by said head being a driven unit, and, disposed between said head and said driven unit, a transmission device according to any one of claims 1 to 14, said casinag of said device being coupled to said head, a first of said arms of said core member supporting said driven unit and a second of said arms supporting a vibration generator.

16. A machine tool according to claim 15, wherein said driven member is connected to an electrical generator so that mechanical vibration and an electrical voltage may be applied simultaneously to said driven member.

17. A machine tool according to claim 16, wherein at least one of said discharge passages of said transmission device is connected to a pressure sensor controlling at least one of said vibration generator and said electrical generator.

* * * * *